J. F. MILLIGAN.
LIQUID MEASURING APPARATUS.
APPLICATION FILED MAR. 17, 1916.
1,427,115.
Patented Aug. 29, 1922.
5 SHEETS—SHEET 1.
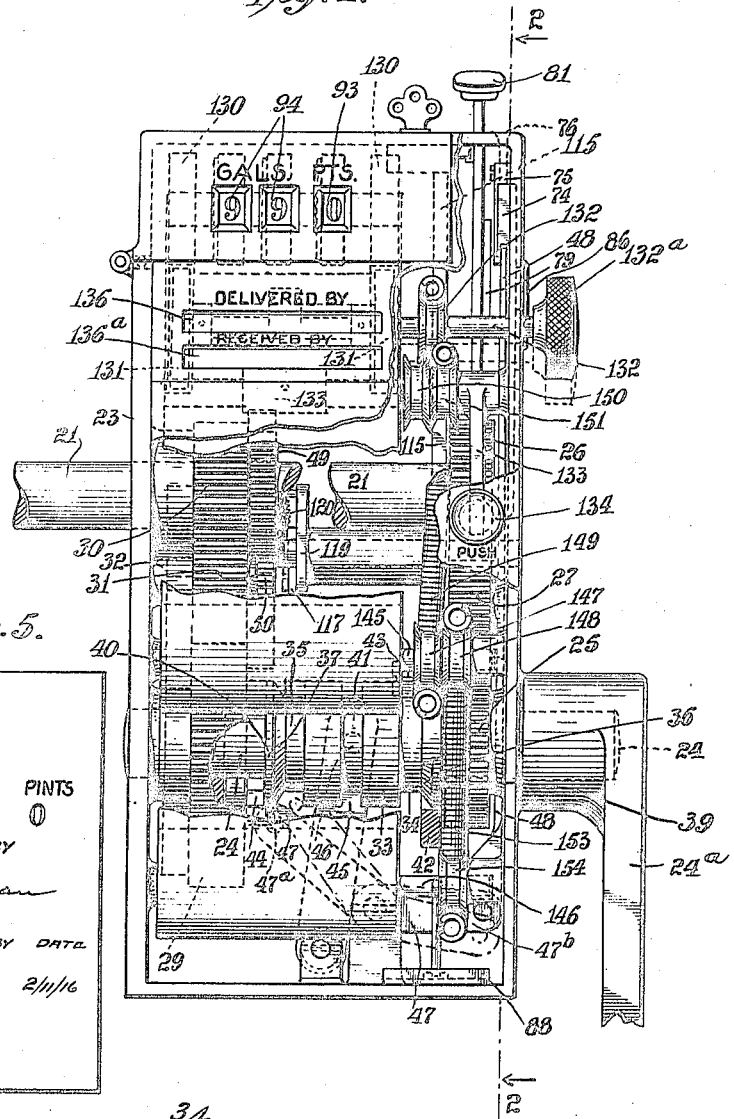
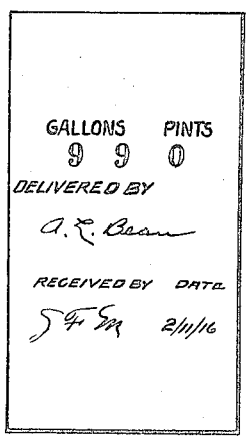
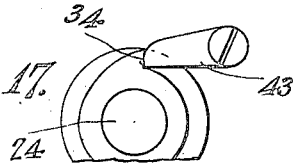
John F. Milligan
Inventor:

J. F. MILLIGAN.
LIQUID MEASURING APPARATUS.
APPLICATION FILED MAR. 17, 1916.
1,427,115.
Patented Aug. 29, 1922.
5 SHEETS—SHEET 2.
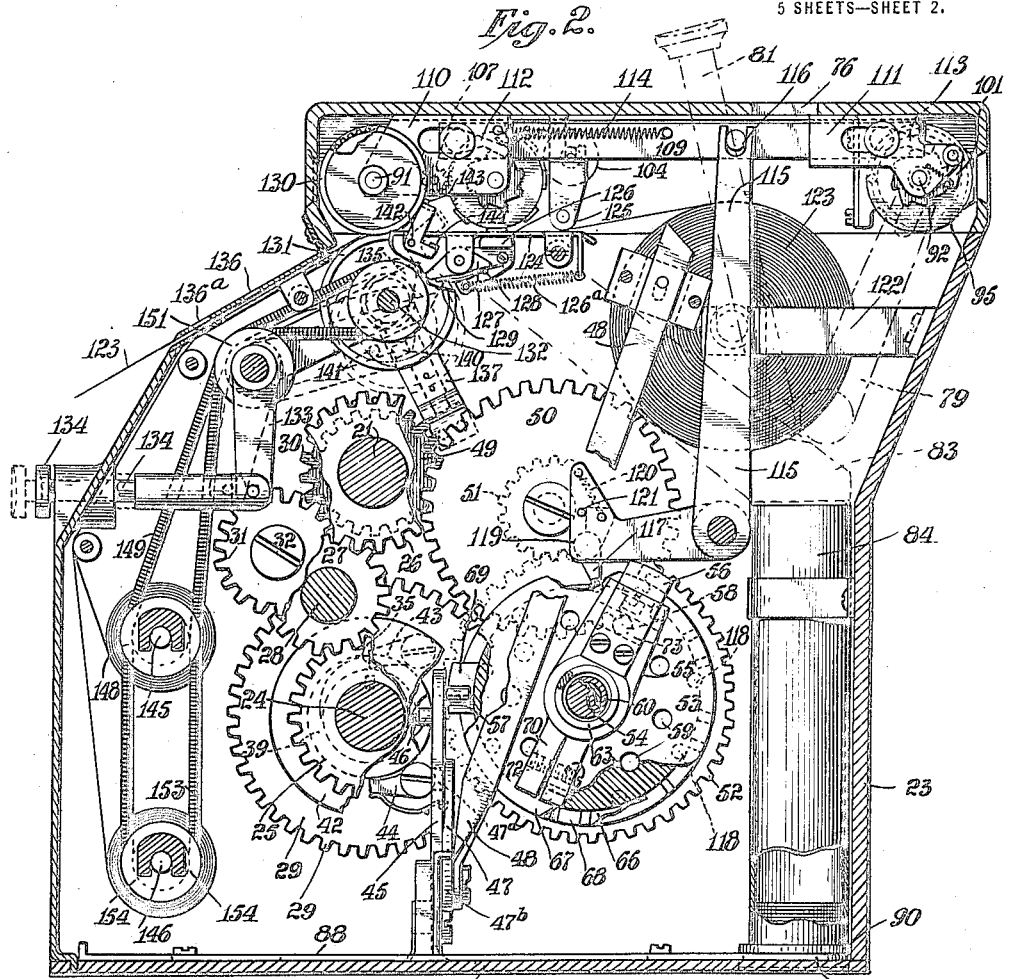
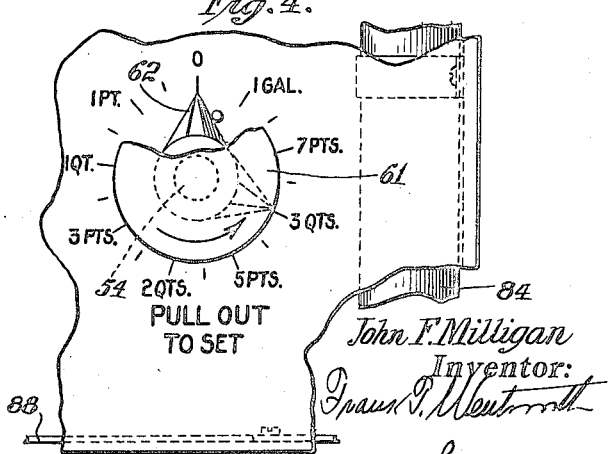
John F. Milligan
Inventor:

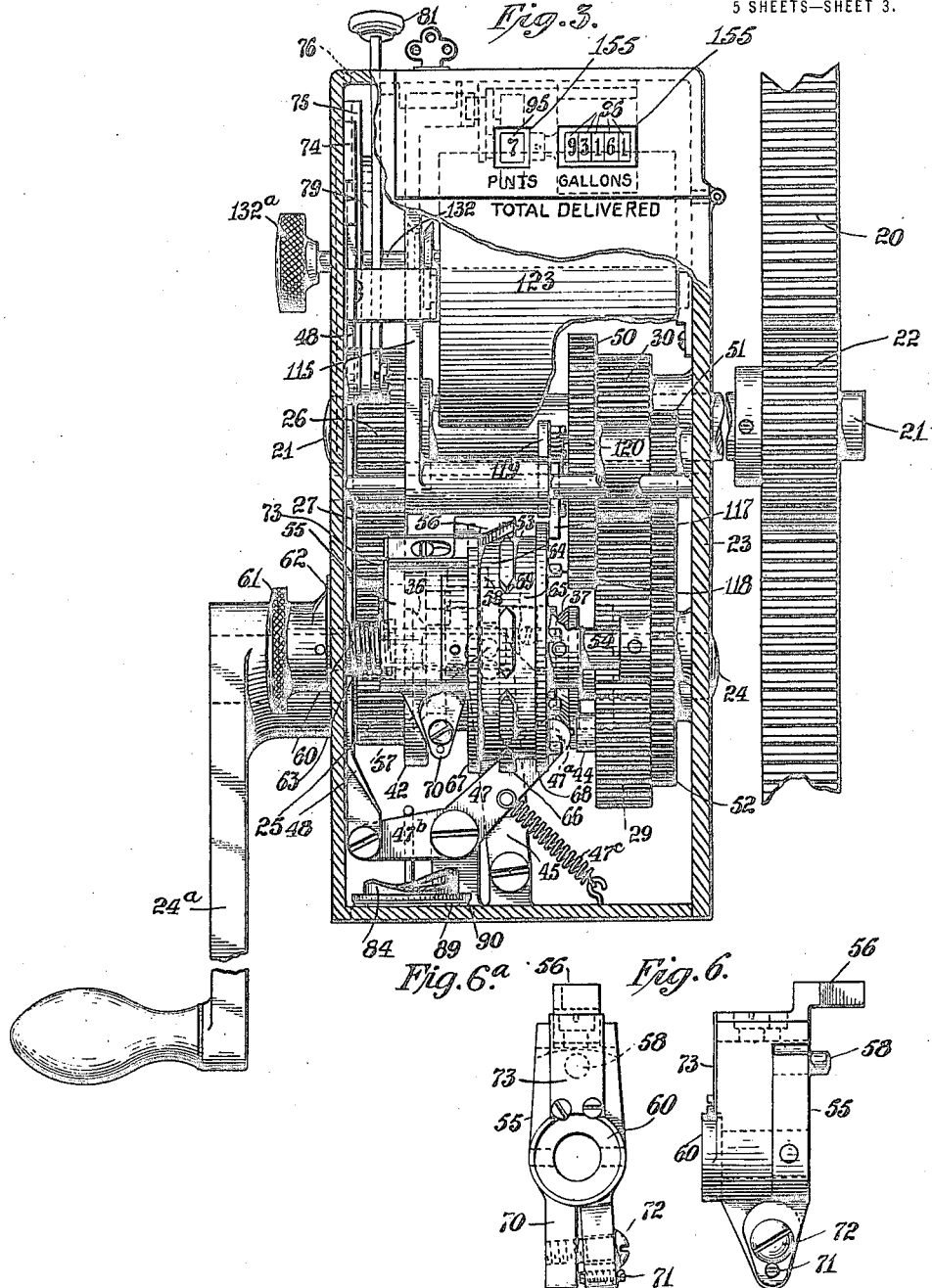

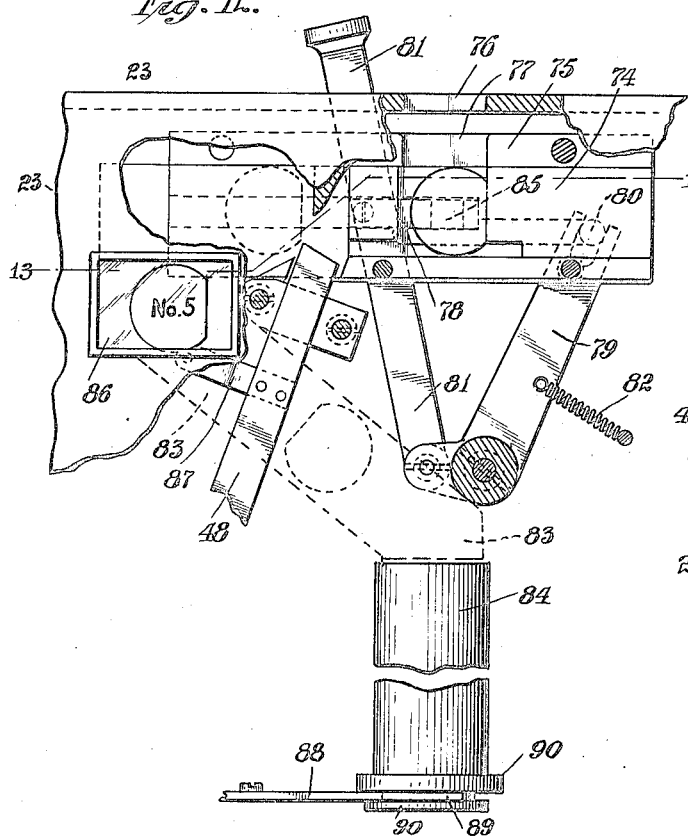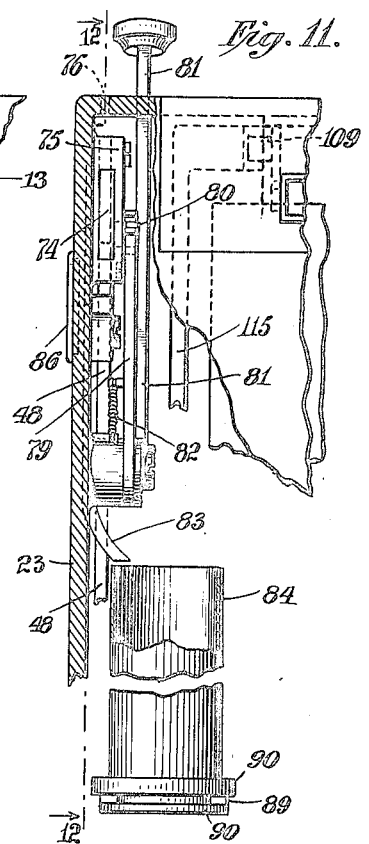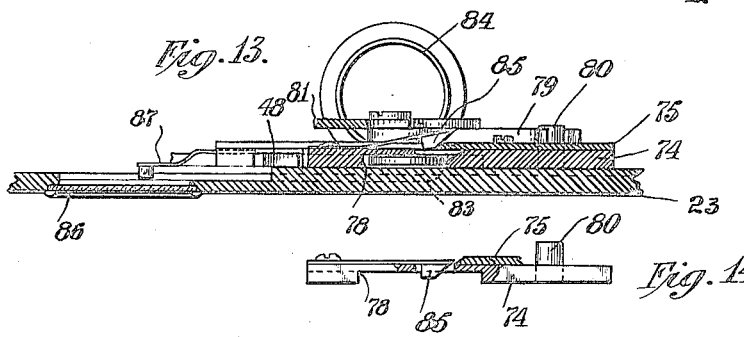

UNITED STATES PATENT OFFICE.

JOHN F. MILLIGAN, OF NEW YORK, N. Y., ASSIGNOR TO LIQUID MEASURING DEVICES CORPORATION, OF NEW YORK, N. Y., A CORPORATION OF DELAWARE.

LIQUID-MEASURING APPARATUS.

1,427,115.  Specification of Letters Patent.  Patented Aug. 29, 1922.

Application filed March 17, 1916. Serial No. 84,840.

*To all whom it may concern:*

Be it known that I, JOHN F. MILLIGAN, a citizen of the United States, residing at the borough of Manhattan, in the city, county, and State of New York, have invented certain new and useful Improvements in Liquid-Measuring Apparatus, of which the following is a specification, reference being had therein to the accompanying drawings, which form a part thereof.

My invention relates to liquid measuring apparatus of a type whereby liquid is withdrawn, by means of a pump, from a container; and more particularly to a pump actuating mechanism by means of which a definite quantity of liquid may be withdrawn from the container as determined by a controlling mechanism embodied in said actuating mechanism and irrespective of the normal capacity of the pump.

In an apparatus made in accordance with my invention, the pump actuating mechanism is so constructed as to be normally inoperative to cause the pump to deliver liquid, means being provided whereby it is adapted to be operatively connected with the pump when it is desired to withdraw liquid from a container, and further means being provided whereby said actuating mechanism is automatically restored to its normal inoperative relation to the pump after a predetermined quantity of liquid has been delivered by the pump. The actuating mechanism after a predetermined quantity of liquid has been drawn by the pump is adapted to restore the pump to a position where, if desired, upon the next actuation thereof, liquid to the full capacity of the pump may be withdrawn.

Apparatus made in accordance with my invention is especially adapted for use in connection with the distribution of gasoline or other hydrocarbons, by garages or other distributing stations, the supply of liquid being furnished to the distributing station by its principal. To adapt an apparatus made in accordance with my invention to this use, I provide a registering mechanism which will not only record the quantity of liquid withdrawn with each actuation of the pump, so that the operator or the purchaser may know with exactitude the quantity of liquid delivered, but in addition thereto, I provide a registering mechanism which will totalize the entire volume of liquid delivered by the apparatus during a prolonged period, which last named registering mechanism is designed to facilitate the adjustment of accounts between the station and its principal who supplies the hydrocarbon to the said station. In conjunction with this registering mechanism, I preferably provide a recording mechanism by means of which a record of the fluid delivered by the pump may be kept, this recording mechanism contemplating the use of a sales slip for delivery to the purchaser, and a duplicate record slip, to be retained by the distributor of the fluid.

To avoid the unauthorized use of the actuating mechanism, I so construct said mechanism that the setting means therefor is normally inoperative and can be made operative solely by means of a special control device, which preferably is in the form of a check adapted to be delivered within the apparatus, after the actuating mechanism has been set, thus permitting the distributor of the liquid to determine by means of this check who the purchaser of the liquid was, in the event of a failure through oversight, to make an autographic record upon the sales and duplicate slips. This characteristic of the invention is designed to provide a check upon the records when the liquid is not paid for when received but is to be charged against the purchaser. The control of the apparatus by means of a check or other device and the necessity for withdrawing a certain predetermined quantity of the fluid, prevents the withdrawing of small quantities of oil from the receptacle, since it is impossible to restore the pump to its normal position, until the completion of that cycle of operations necessary to deliver the maximum quantity for which the pump is set or until that quantity has been actually withdrawn from the container and the amount so withdrawn has been indicated upon the registering mechanism.

The invention consists in the novel features of construction and combination of parts hereinafter set forth and described and more particularly pointed out in the claims hereto appended.

Referring to the drawings:—

Fig. 1 is a side view of an apparatus embodying my invention, a portion of the casing being broken away to disclose the internal mechanism;

Fig. 2 is a section on the line 2—2 of Fig. 1;

Fig. 3 is a view of the other side of the apparatus shown in Fig. 1 with a portion of the casing broken away to disclose the internal mechanism;

Fig. 4 is a view of a portion of the front of the machine showing the setting knob;

Fig. 5 is a view of one of the sales slips removed from the apparatus;

Figure 7:
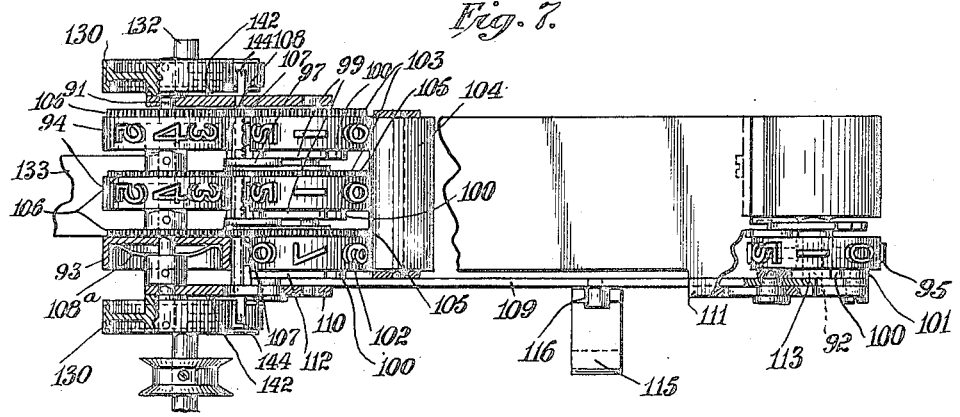
Figure 8:
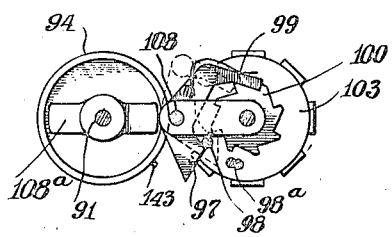
Figure 9:
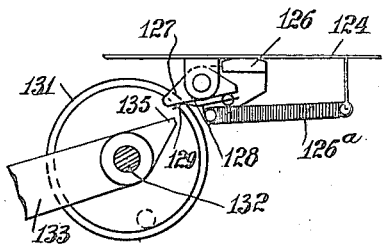
Figure 10:
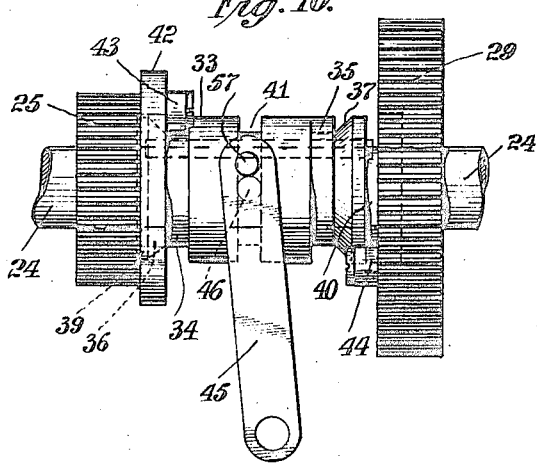
Figures 15, 16:
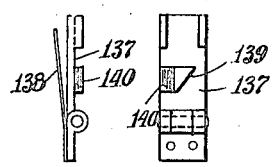

Figs. 6 and 6ᵃ are respectively a side elevation and a front elevation of the restoring cam carried by the measuring wheel;

Fig. 7 is a plan view of the registering and recording mechanism;

Fig. 8 is a side view of the registering and printing wheels showing the transfer mechanism;

Fig. 9 is a detail view of the hammer of the recording mechanism;

Fig. 10 is a detail view of the coupling shaft;

Fig. 11 is an elevation of the upper portion of the setting mechanism;

Fig. 12 is a section on the line 12—12 of Fig. 11;

Fig. 13 is a section on line 13—13 Fig. 12;

Fig. 14 is a detail view of the check slip;

Figs. 15 and 16 are detail views of the cut-off cam, and

Fig. 17 is a detailed view of the single tooth ratchet gear.

Like reference numerals refer to like parts throughout the several views.

An apparatus made in accordance with my invention may be advantageously used in connection with any type of pump wherein one cycle of operations of the pump will result in the delivery of a definite volume of liquid, the purpose of my invention primarily being to provide an actuating mechanism for such a pump, by means of which the operations of the pump may be so controlled as to accurately vary the volume of liquid delivered thereby. The form of the invention shown is especially adapted for use with a reciprocating piston pump having an old and well known construction, the details of said pump not being shown in the drawings. In this type of pump, the piston rod carries a rack 20 by means of which it is reciprocated.

In the embodiment of my invention shown in the drawings, I provide a driven shaft 21 carrying a gear 22 normally in mesh with the rack 20. The shaft 21 is mounted in a casing 23 which may be secured in relation to the pump in any desired manner. Also mounted in the casing 23 is a driving shaft 24 adapted to be turned by means of the crank handle 24ᵃ. Between the driving shaft 24 and the driven shaft 21 are two power transmission systems adapted to be independently connected with the driving shaft to permit the actuation of this shaft to impart movement to the piston rack 20 in either direction. In the form of the invention shown the first of these transmission systems comprises the gear 25 idly mounted upon, and adapted to be coupled to the shaft 24, the gear 26 carried by and rotatable with the shaft 21 and the intermediate idler gear 27 mounted upon the stud 28. This gear train is adapted to raise the piston at a low speed. The other gear train comprises the gear 29 also idly mounted upon the shaft 24 and also adapted to be coupled thereto; the gear 30 mounted upon and rotatable with the shaft 21 and the intermediate idler gear 31 mounted upon the stud 32. This gear train is adapted to return the pump piston to normal at high speed. In conjunction with this power transmission mechanism I provide means whereby the gear 25 may be coupled to the shaft 24 to cause the pump to deliver liquid and automatically acting means whereby said gear will be uncoupled from said shaft, and the gear 29 coupled thereto so that the said power shaft 24 may be used to restore the pump to its normal position. In conjunction with this last named means, I provide a measuring wheel whereby the uncoupling of the gear 25 and the coupling of the gear 29 with relation to said shaft 24 may be so timed as to ensure the delivery of no more than a certain predetermined volume of liquid.

In the form of the invention shown, the coupling mechanism comprises a sleeve 33, splined or otherwise mounted upon the shaft 24 so as to be rotatable therewith and be capable of axial movement in relation thereto. This sleeve has, adjacent the gear 25, a single toothed ratchet gear 34 and adjacent the gear 29 a single toothed ratchet gear 35, annular bevels 36 and 37 being formed on said sleeve adjacent and upon opposite sides of the gears 34 and 35 respectively, said bevels terminating in each instance in an annular track 39 or 40. Centrally of the sleeve 33 is a pinway 41 adapted to receive the actuating means by which said sleeve is shifted axially of the shaft 24. Carried by the gear 25 is a disk 42 having a spring pressed pawl 43 adapted to engage the single tooth upon the gear 34. Carried by the gear 29 is a spring pressed pawl 44 adapted to operatively engage the single tooth upon the gear 35.

Pivotally mounted in the casing 23 is an arm 45 carrying a pin 46 seated in the pinway 41, the actuation of said lever in one direction having the function of moving the sleeve 33 into such relation to the gear 25 as to cause the pawl 43 to operatively engage the gear 34, and of moving said sleeve in the opposite direction to first disconnect the sleeve from the gear 25 and then bring it into relation with the gear 29 so as to cause the pawl 44 to operatively engage the gear 35. This lever may also be so actuated as to bring the sleeve into such a position that neither of said pawls can operatively engage its gear.

Mounted adjacent the lever 45 is a bell crank lever 47, one arm of which is provided with a pin 47ª adapted, with the oscillation of said lever, to operatively engage the lever 45 and impart such movement thereto as will force the sleeve 33 toward the gear 25. Attached to the other arm 47ᵇ of said bell crank lever is an actuating stem 48, the depression of which will oscillate said bell crank lever against the tension of the restoring spring 47ᶜ and rock the lever 45 which results in the movement of the sleeve 33 toward the gear 25 to set the actuating mechanism and cause the pump to deliver liquid.

In the accompanying drawings, I have shown a check control apparatus for actuating the stem 48 and will hereinafter describe this mechanism in detail.

To impart a return throw to the lever 45 to first disconnect the shaft 24 from the gear 25 and then connect it with the gear 29, I provide a rotatable cam actuated from the driven shaft 21 through the gear train 49—50—51—52. By driving the sleeve actuating mechanism from the driven shaft, or the shaft acting directly upon the pump, I cause the uncoupling of the gear 25 from the driving shaft, to be under the control of the mechanism transmitting power to the pump and thus secure the timing of the cut-off with relation to the movement of the pump, in a manner to compensate for any wear which may occur in the gear train connecting the driving shaft and the driven shaft. Preferably the cut-off mechanism is so constructed as to permit the cam to be adjusted in a manner to vary the interval during which the driving shaft is operatively connected with the driven shaft and thus permit variance in the volume of liquid delivered by the pump upon succeeding actuations of the setting stem 48.

The automatic cut-off mechanism comprises a wheel 53 carried by and rotatable with the shaft 54 carrying the gear 52. Rotatably mounted upon the shaft 54 is a cam block 55 carrying a cam 56 projecting partially across the periphery of said wheel, and adapted to operatively engage a pin 57 carried by the lever 45, and impart a throw to said lever sufficient to disengage the pawl 43 from the gear 34 and cause the pawl 44 to engage the gear 35. The block 55 and the wheel 53 are provided with co-operating means whereby said block may be held in a fixed relation to the latter in any adjusted position. In the accompanying drawings, I have shown an apparatus adapted to be used to deliver a maximum of one gallon of liquid with each actuation thereof, and have so arranged the adjustment mechanism between the said block and the said wheel that the cam may be set so that one or any number of pints up to the full gallon may be delivered. The setting mechanism for the block 55, in the form of the invention shown, comprises a pin 58 carried by the block 55, and nine sockets 59 in the adjacent face of the wheel 53, the nine sockets being provided to permit the cam to be so set that it will be impossible to actuate the setting stem 48 unless the cam 56 is set for the delivery of some definite quantity of liquid. The block 55 is carried by, and rotatable with, a sleeve 60 projecting exteriorly of the casing 23 and provided with a handle 61 carrying an indicating finger 62. The casing 23 is provided with graduations, as shown in Fig. 4, indicating different volumes of liquid, to facilitate the adjustment of said block. In view of the pin and socket setting means between the block 55 and the wheel 53, it is necessary that the sleeve 60 be adapted to have movement axially of the shaft 54 under the control of the handle 61. To ensure a positive locking of the said block in relation to said wheel, I provide a spring 63 acting between said block and the front of the casing 23.

The periphery of the wheel 53 is provided with two parallel, circumferential pinways 64 and 65, separated by a partition 66 interrupted upon the same radii as the sockets 59, to form slots of sufficient length to permit the passage of the pin 57 from one pinway to the other under the control of the cam 56, said wheel being provided with side flanges 67 and 68 for limiting the lateral movement of said pin. The slots through the partition 66 are of sufficient length to permit that adjustment of the cam 56, hereinafter referred to, which may be necessary to correct any error in the measuring mechanism due to wear upon any of the parts, or in other words, that adjustment necessary to secure accurate measure in the volume of liquid delivered. Adjacent the socket 59 in the neutral position or that position when the sleeve 33 is unconnected with either gear 25 or 29, I provide the wheel 53 with a fixed cam 69, (see Fig. 2 and Fig. 3), the width of the cam being substantially the width of the channel 65 so that a partial return throw will be given to the lever 45 sufficient to position the pin 57 in one of the slots in the partition 66 when the parts are so positioned. This cam 69 will thus have the function of disconnecting the driving member from the driven member when the pump piston has been returned to its normal low position. While the partition 66 and the cam 69 introduce desirable refinements in the apparatus, such are not essential to the successful operation of the device.

The diameters of the several gears 49—50—51—52 are such as to ensure one full rotation of the wheel 53 with each full throw of the pump piston, it being entirely immaterial what the rate of movement of the piston may be. In the form of the invention shown, it requires approximately four and one half revolutions of the shaft 24 to impart a full stroke to the pump piston, and about two revolutions thereof in the opposite direction to impart a full return stroke to said piston.

To ensure an operation of the apparatus in conformity with the governmental standard of liquid measure, I preferably so construct the mechanism supporting the cam 56 as to permit the adjustment of this cam circumferentially of the wheel 53. To admit of this adjustment, I pivotally mount upon the sleeve 60 a lever 70 bearing upon the block 55 and extending upon opposite sides of the said sleeve 60. One arm of this lever carries the cam 56 and the other arm thereof is adapted to be acted upon by an adjustment screw 71, by means of which, a minute positive movement may be imparted to said lever. I also provide said lever with a set screw 72 by means of which it may be set in its adjusted position.

The cam 56 is acted upon by a spring 73 carried by the lever 70, the function of this spring being to impart movement to the lever 45 after the gears 25 or 29 have been disconnected from the sleeve 33 and driving shaft 24, which movement is necessary to ensure the connection of said sleeve and said shaft with the other gear 29 or 25. The riser of the cam 56 is of a height to cause the driving mechanism to impart the desired shifting action to the sleeve 33 and at the same time store up sufficient energy in the spring 73 to ensure this excess movement, the cam 56 being provided with an extended surface beyond the riser sufficient to ensure the desired maximum throw of the said lever. The cam 56 is provided with suitable guiding means such as a pin and slot connection, as shown in Fig. 3.

As heretofore described, the actuating mechanism controlling the pump is normally so set as to preclude possibility of the utilization of the pump for delivering oil until the setting mechanism has been actuated. By so constructing this setting mechanism that a check or some other device is required to actuate same, I secure a locking effect upon this mechanism which will prevent the unauthorized use of the pump. While in the form of the invention shown the setting mechanism is check controlled, it must be understood that the object of this control is not for the purpose of ensuring payment for the merchandise delivered, since the same mechanism and the same type of check is used irrespective of the quantity of the liquid for the delivery of which the mechanism is set. A check is used merely as a convenient form of key for unlocking the actuating mechanism, and incidentally to enable the garage or station to identify any duplicate sales slip in the event that the attendant fails to make an autographic record of the purchaser or to secure his receipt for the fluid delivered. As will hereinafter appear, the quantity of fluid delivered will be automatically recorded.

In the accompanying drawings, I have illustrated a special form of check control apparatus which is desirable for use in connection with the herein described apparatus, this mechanism comprising a reciprocatory carriage 74 mounted in a casing 75 adjacent the top of the machine. The said casing and the top of the machine, have registering slots 76—77 by means of which a check may be inserted in a recess 78 in one side of the carriage 74, said recess being open at the top and bottom. Mounted adjacent the carriage 74 is a bell crank lever 79, the throw of which is sufficient to impart the desired reciprocatory movement to said carriage. One end of a long arm of said lever, is connected with said carriage, by a pin and slot connection 80, and the other and short arm of said lever is provided with a plunger 81 by means of which the carriage is reciprocated, said plunger 81 extending exteriorly of the top of the main casing 23. A restoring spring 82 is operatively connected with the mechanism operating the carriage 74. The upper end of the stem 48 is beveled and projects through an elongated slot in the bottom of the casing 75 into the path of movement of the carriage 74, the bottom of which toward the forward edge of said carriage is cut away to afford the proper clearance to permit movement of this carriage without engaging said bevel. In this manner the engagement of the check with the wall of the way of the casing 75 and with the bevel on the stem 48 will actuate the said stem 48 upon the forward reciprocation of said carriage. Opening into the casing 75 beyond the bevel on the stem 48 is the mouth of a runway 83, which discharges into a receiver 84 for the said checks. Preferably the mouth of the runway 83 is offset with relation to the ways in the frame 75, the check being thrust laterally from the slot in the carriage 74 by the spring 85 secured to said carriage.

To ensure the tensioning of this spring, I provide the inner face of the casing 75 with a bevel as shown, so that said spring will be held clear of the recess 78 when a check is being inserted through the openings 76—77. I also provide in the course of the runway 83, a sight opening 86 having a covering of transparent material such as mica or glass, and provide the stem 48 with an extension 87 so that the check last used will be held by the said stem adjacent the opening 86 to view.

The receiver 84 is detachably mounted in and passed through an opening in the bottom of the casing 23, being held in place by a slide 88, the forked end 89 of which straddles said receiver and engages between parallel collars 90 thereon.

In conjunction with the measuring wheel 53, I employ two sets of registering wheels adapted to indicate the quantity of liquid delivered with each actuation of the actuating mechanism as determined by said measuring wheel and the aggregate quantity of liquid delivered by the pump during any interval. In conjunction with the first set of wheels, I employ a set of printing wheels by means of which the quantity of liquid delivered at any time may be recorded upon a sales record blank. I will hereinafter describe said recording mechanism more in detail.

For convenience of design, I drive the registering wheels from the printing wheels and have the main actuating mechanism operate only upon one set of said wheels.

Mounted in any convenient portion of the main casing 23 upon parallel shafts 91—92, are the individual transaction registering wheels and the total adder registering wheels. The first of said sets of wheels comprising a wheel 93 indicating the unit of measure for which the machine may be set, (in the instance shown a pint) and a plurality of wheels 94 indicating the standard of measure, (in the form of the invention shown gallons). The totalizing mechanism includes a wheel 95 indicating the same standard of measurement as the wheel 93 and a set of wheels 96 indicating the same standard of measurement as the wheels 94, the wheels 96 being greater in number than the wheels 94 by reason of the necessity for their registering a greater number of gallons. Any desired transfer mechanism between the wheels 95 and the wheel 96 of lowest denomination and between the wheels 96 of succeeding denominations, may be employed, the mechanism between the wheel 95 and the wheel 96 being operative upon each eighth actuation of the wheel 95, while the other transfer mechanisms are operative upon each tenth actuation of the wheel controlling the actuation thereof. The mechanism employed in the totalizing mechanism may be that shown in Fig. 8 of the drawings, which consists of an oscillatory lever, one arm of which has a cam face 97 adapted to be engaged by a pin 98 upon the actuating wheel, and the other arm of which is a spring pressed pawl 99 adapted to operatively engage a ratchet wheel 100 carried by the wheel of next higher denomination. The ratchet 100 of the pints wheel 95 is acted upon by a spring pressed holding pawl 101. The transfer lever carrying the pawl 99 is restored to normal after each actuation thereof by the pin 98. Upon the "gallon" wheels, a pin positioned as indicated at 98ᵃ is used, instead of a pin positioned as is the pin 98 so as to cause the actuation of the wheel of next higher denomination to be properly timed. Associated with the registering wheels 93—94 is a pints printing wheel 102 and a set of two "gallons" printing wheels 103, said printing wheels having associated therewith an inking roller 104. Each of the wheels 102 and 103 has upon one side thereof a ratchet wheel as 100, such as heretofore described and upon the other side thereof a spur gear such as 105 (See Fig. 7) adapted to mesh with and drive gears 106 upon the registering wheels 93—94, by means of the idler pinions 107 so as to cause the said registering wheels and the printing wheels to have simultaneous similar movements. The pinions 107 and the transfer levers are all mounted upon the same shaft 108.

The gears 93—94 are idly mounted upon the shaft 91 being adapted to be connected therewith by means of a friction clutch mechanism composing the spring 108ᵃ carried by and rotatable with said shaft, this construction being designed to permit the restoration of the wheels 93—94 to normal irrespective of the quantity of return rotation of the said shaft.

Mounted adjacent said registering wheels is a slide 109 supported in bearing frames 110—111 having elongated slots therein, said slide carrying the pawls 112—113 adapted respectively to operatively engage the ratchets 100 upon the pints wheel of the printing mechanism and of the totalizing mechanism. Upon the said slide is a restoring spring 114 having the function of restoring said slide 109 and the pawls 112—113 to their normal position after each actuation of the registering and printing mechanisms.

Mounted adjacent the measuring wheel 53 is a bell crank lever 115, one arm of which is connected by a pin and slot construction shown at 116, with the slide 109, and the other arm of which has mounted thereon a swivel 117 adapted to be engaged by pins 118 upon said measuring wheel. Said swivel is pivotally mounted at 119 and is acted upon by a spring 120 normally tending to hold it against a stop 121 so that the rotation of the wheel 53 in one direction will oscillate the bell crank lever 115 and the movement of said wheel in the other direction will merely unseat the swivel 117 and have no operative effect in actuating the said lever 115. The pins 118 are so set as to be operative to actuate the registering and recording mechanism in conformity with the setting of the cam 56 for controlling the volume of liquid delivered. There would be in the construction shown eight of these pins upon the wheel 53, the location of these pins being determined by conditions under which it is desired to operate the mechanism. Preferably these pins will be so set that immediately following the initial actuation of the driven shaft 21, one pint would be registered upon said registering and recording mechanism, thus making it necessary for the user of the machine to continue the operation thereof until the full pint has been actually delivered. If desired, however, the pins may be so set that the registering and recording mechanisms will be actuated only after the full pint has been delivered. In the form of the invention shown the lever 115 will receive eight oscillations with each full rotation of the wheel 53.

When the wheel 53 is in its normal position, and it is desired to actuate the registering mechanism upon the initiation of the delivery of the liquid, one of the pins 118 will be in position about to engage the swivel 117 and the remaining pins will be spaced at equal distances apart so as to successively engage the swivel, there being a space equal to twice the distance between the other pins, between the pin first engaged, and the pin immediately in advance thereof. This skipping of one pin is due to the fact that since the cam when in one position will prevent the delivery of any liquid, there must be a corresponding position of the pins 118, to avoid a possible actuation of the registering mechanism through a slight overrun of the wheel. If, however, it be desired to register the liquid only after the full quantity has been delivered, the pins will be so spaced that upon the initial movement of the shaft 21, the wheel 53 and its cam 56 will have a movement equal to that necessary to withdraw one pint, before any pin engages the swivel 117. Hence, when this arrangement is used the first pin which will operatively engage the swivel, will be spaced away from the swivel when the wheel is at neutral, a distance equalling the travel of the wheel necessary to delivery one full pint.

Mounted in suitable brackets 122 is a spindle carrying a paper web 123 upon which a record of the transactions in which the machine is used, is adapted to be made, part of this record being made by the recording mechanism of the machine and part thereof autographically. Adjacent the printing wheels 102—103 is a platen 124 having suitable openings below and adjacent said wheels, a guide roller 125 being provided to hold said paper web upon said platen. Pivotally mounted upon lugs adjacent said platen 124 is a hammer 126 adapted to strike the under side of the paper and cause an imprint to be made upon the top surface thereof by the characters upon the printing wheels. This hammer 126 receives its operative stroke under the control of the spring 126$^a$. Pivoted upon the same shaft as the hammer 126 is a setting lever 127, one arm of which acts upon a pin 128 carried by the hammer 124. The other arm of said lever is acted upon by the spring 129. Mounted upon the shaft 91 and rotatable therewith are a plurality of friction wheels 130 adapted to be operatively engaged by the friction wheels 131 mounted upon a shaft 132 adapted to have movement substantially radially of the registering wheels 93—94, so that said wheels 131 may be brought into engagement with the wheels 130 and used to feed the paper web through the machine. The shaft 132 upon which the wheels 131 are mounted, projects through the wall of the casing 23 and carries a knob 132$^a$, by means of which said shaft may be manually turned. Preferably said shaft is mounted in one arm of a bell crank lever 133 acted upon by a plunger 134, the head of which is also exposed exteriorly of the casing 23. When it is desired to make a record of the delivery of liquid by the machine, the plunger 134 is pressed inwardly oscillating the bellcrank lever 133 in a manner to force the wheels 131 toward the wheels 130 thus clamping the paper strip between these two sets of wheels so that a rotation of the shaft 132 will result in a feeding of the said strip.

To avoid the making of an imprint from the type wheels 102—103 while the paper is having movement, I provide means, as the striker 135 carried by and having movement with, the shaft 132 of the supporting arm therefor. As the said striker is raised in forcing the wheels 131 into engagement with the wheels 130, it engages the setting lever 127 and forces the hammer 126 downwardly against the tension of its spring 126$^a$ subsequent movement of said striker 135 resulting in its passing said setting lever, thus releasing the hammer and permitting it to strike before or substantially simultaneously with the engagement of the wheels 130—131. The setting lever being pivotally mounted avoids any possible interference between the striker and the hammer when the latter has been released.

To avoid such a separation of the wheels 130—131 as would result in a failure of this mechanism to feed the strip, I provide means whereby the shaft 132 will be held in the raised position during the entire interval necessary to feed the strip the desired length, means being provided whereby the holding device will be automatically released to cause the separation of the said wheels 130—131 after the desired quantity of feeding movement of the strip. This means, in the form of the invention shown, comprises an arm 137 pivotally mounted in the casing 23, adjacent one end of the shaft 132. Said arm is provided with a spring 138 normally thrusting it toward the adjacent wheel 131. Also carried by the arm 137 is a cam having two risers 139—140 adapted to be engaged by a pin 141 carried by the adjacent wheel 131. The construction of this arm is illustrated in Figs. 15 and 16, of the accompanying drawings. The mechanical construction above referred to will have the two-fold function of ensuring the supporting of the wheels 131 during the desired interval, and of disengaging the top of the arm 137 from the shaft 132 at the completion of the feeding movement so as to permit the wheels 131 to drop out of the operative relation of the wheels 130 at this instant. It will be observed that upon the elevation of the wheels 131 under the control of the plunger 134, the shaft 132 will pass above the arm 137 which under the control of its spring 138 will pass under said shaft and remain in this position until the pin 141 engaging the cam surface 139 forces it laterally from beneath said shaft.

As the wheels 131 are raised, the pin 141 will engage the cam surface 139, and through the resultant rotation of the shaft 132 bring the said wheels to the desired starting point. Furthermore, said cam 139—140 will resist any back thrust upon the striker 135.

I also utilize the wheels 131 for the purpose of restoring the printing wheels 102—103 and the registering wheels 93—94 to normal after the making of each record. To secure this result, I provide an oscillatory stop bar 142 projecting parallel with the shaft 91 and extending in close juxtaposition to the periphery of the several registering wheels 93—94. Each of these wheels, I provide with a radially extending pin 143 adapted to engage the said stop bar 142. This bar 142 is pivotally mounted so that it is normally without the range of movement of the said pins 143, the opposite ends thereof being provided with extensions 144 projecting in the path of the wheels 131 so that as said wheels are raised they will engage said extensions, and rock the bar about its pivotal supports in a manner to so position it that when the said wheels 130 are turned in feeding the paper strip, their movement will be arrested by the engagement of the pins 143 with the bar 142 when each said wheels registers zero at the sight opening in the casing 23 through which said registering wheels may be inspected. When the paper feed wheels 131 return to their normal low position, out of engagement with the wheels 130, the bar 142 will, through gravity, drop to its inoperative position in relation to the pins 143 allowing the free rotation of said wheels 93—94. The frictional connection between the shaft 91 and the several registering wheels 93—94, will permit the continued rotation of said shaft and the wheels 130 after the stoppage of said registering wheels.

In the form of the invention shown, I provide two rewinding reels mounted upon spindles 145—146 adapted to receive the duplicate strip and the carbon strip with which said duplicate is made. Said spindle 145 carries two pulleys 147—148, an extensible belt 149 passing about the pulley 147 and about two idler pulleys 150—151 mounted upon the shaft carrying the bell crank support 133, and about a pulley 152 upon the shaft 132. A second extensible belt 153 passes about the pulleys 148 and about a pulley 154 upon the spindle 146. In this manner the re-winding spindles are actuated simultaneously with the shaft 132, the extensibility of the belt permitting that compensation necessary because of the continued variance in the diameters of the material on the rewinding spindles.

Upon the side of the casing 23, I provide openings 136—136ᵃ, through which the web or strip is exposed before the actuation of the delivery mechanism, said openings permitting the making of autographic records upon both the upper paper strip, and a carbon copy thereof upon the lower paper strip.

While in the form of the invention shown I contemplate providing two paper webs with a web of carbon disposed therebetween, it is apparent that any other desired duplicating arrangement may be used in lieu thereof.

The casing 23 has a sight opening 155 therein, through which the wheels 95—96 of the totalizer may be observed.

To permit ready access to the interior of the machine for the purpose of inserting the web or strip, I mount the entire registering mechanism in a box-like cover so hinged and so formed as to permit the opening of the top of the box without, however, disturbing the setting mechanism.

In describing the operation of the pump actuating mechanism shown in the accompanying drawings, I will first consider those functionings by which the actuation of the pump in delivering the liquid, will be at a low speed, and a return of the pump to normal will be at relatively higher speed. I will then describe the functionings by which a predetermined and a variable quantity of liquid may be delivered with each actuation of the pump and will follow this with a description of the functionings of the setting mechanism, of the registering mechanism and of the recording mechanism.

Assuming that the sleeve 33 is in a position where neither of the pawls 43 nor 44 are in engagement with their respective ratchet gears 34 and 35, it will be observed that the handle 24ª is free to turn in either direction without having any operative effect upon the driven shaft 21. When it is desired to draw liquid by means of the pump, the setting mechanism is actuated, the depression of the stem 48 oscillating the bell crank lever with which the lower end of the stem is connected in a manner to cause the pin 47ª to engage the lever 45 and oscillate it in a manner to cause the pin 57 carried thereby to shift the sleeeve 33 toward the gear 25. With this movement of said sleeve, the pawl 43 will ride down the bevel 36 and drop into engagement with the ratchet gear 34, thus coupling the said gear 25 to the driving shaft 24. When the gear is so coupled to this shaft power will be transmitted through the gear 26 and idler 27 to the driven shaft 21 in a manner to cause said shaft to actuate the pump, the gars 22 and rack 20 in the form of the invention being utilized for the purpose of applying this power to the pump.

The sleeve 33 being splined to the shaft 24 may be shifted when the desired operative movement has been imparted to the pump, away from the gear 25 in a manner to disconnect said gear from the driving shaft and at the same time connect the gear 29 to said shaft so that the driving shaft may be actuated in a manner to restore the pump to its normal position.

When the gear 25 is coupled through the sleeve 33 to the driving shaft, the pawl 44 carried by the gear 29 will ride upon the track 40 and be held thereby out of the operative relation to the ratchet gear 35. With the shifting of the sleeve 33 away from the gear 25, however, the said pawl 44 will pass from said track 40 down the bevel 37 into engagement with the said gear 35, the pawl 43 during the same interval being raised by the bevel 36 out of engagement with the gear 34, finally coming to rest upon the track 39.

By providing automatic shifting means for the sleeve 33 and timing the actuation of the shifting mechanism with relation to the pump capacity, I am enabled to secure the delivery of a measured quantity of liquid.

With the continued rotation of the driven shaft 21 under the control of the gear 25, the measuring wheel 53 carrying the cam 56 will be rotated, the extent of rotation of said wheel being such that it will receive one full revolution with that quantity of rotary movement of the driven shaft necessary to actuate the pump to its full capacity. As the cam 56 approaches the limit of its movement for determining the cut-off interval for the pump, it will engage the pin 57 upon the lever 45 and impart the desired reverse throw to the sleeve 33. The said cam being acted upon by the spring 73, it will upon its initial impact with the said pin 57 yield to an extent defined by the guide pin for said cam so as to store up sufficient energy in said spring 73 to ensure the desired maximum shifting movement of the sleeve 33, in the event that this sleeve has not been shifted sufficiently to entirely disconnect it from one of the gears 25 or 29, and connect it with the other gear by reason of the fact that in making this shift there may be a slight interval during which the sleeve will be disconnected from both said gears. The cam 69 which is fixed upon the wheel 53 will when the maximum return movement has been imparted to the pump, act upon the pin 57 in a manner to disconnect the sleeve 33 from the gear 29 without, however, connecting said sleeve with the gear 25.

By having the pin 47ª normally disengaged from and spaced away from the lever 45, the movements of the sleeve 33 referred to are permitted without having any operative effect upon the setting stem 48.

By reason of the difference in the relative diameters of the gears 25 and 29, the delivery movement of the pump will be of relatively lower, speed than the return movement thereof. While in the form of the invention shown the restoring movement of the shaft 24 is in a direction opposite to that of the delivery movement of said shaft, it is apparent that this is merely a matter of the arrangement of the gear train and that any other arrangement of said train may be used to transmit movement from the driving shaft to the driven shaft for the return of the pump, which will secure a reversal, in the direction of rotation of the driven shaft.

When it is desired to secure the delivery of a variable quantity of liquid by means of this apparatus, the cam 56 may be moved circumferentially about the wheel 53 by means of the handle 61, this handle being drawn out to disengage the pin and socket connection between the block 55 and the wheel 53, and the sleeve 70 being turned until the finger 62 indicates the quantity of liquid which it is desired to deliver. When the cam has been set in this manner the handle is released, the spring 63 restoring the block 55 to its normal position so as to cause the cam to have movement with the said wheel. In this manner the timing of the shifting of the sleeve 33 may be varied so as to limit the time during which the gear 25 is coupled to the driving shaft to that required to deliver only that volume of liquid indicated by the finger 62. In Figs. 2 and 3 of the accompanying drawings, the cam 56 is shown as being set for the delivery of three quarts of liquid. After the predetermined amount of liquid has been dispensed by the pump, the drive connection between the pump and the driving shaft is disconnected through the actuations of the cam 56. This shifts the sleeve 33 from the gear 25 into engagement with the gear 29. The pawls 43 and 44 are arranged to clutch in one direction only so that if the operator continued to turn the crank in the operative direction, after the cam had shifted the sleeve 33, the pawl 44 would simply idle around the ratchet gear 35.

By the use of the adjusting mechanism described for securing minute circumferential adjustment of the cam 56 about the wheel 53 independently of the block 55, I am enabled to secure that slight variance in the operative moment of said cam which may be necessary to conform the pump actuating mechanism to the requirements of the government as to the standard of measurements. In fact, by this arrangement accuracy in the volume of the liquid delivered may be secured and any correction of error which may creep into the mechanism from continued use may be made.

I use the partition 66 for the purpose of having two well defined grooves for the pin 57, and preventing the shifting of said pin from one groove to the other except at a point where the cam may be set to effect this movement.

The restoration of the wheel 53 to normal will result in the return of the said cam to normal so that the finger 62 in addition to facilitating the setting of said cam will also indicate exteriorly of the machine the quantity of liquid being drawn as it is drawn. This condition permits the cam to be set at one gallon and when the gallon is withdrawn, the restoration of the parts will still leave the machine set for one gallon so that no resetting of the machine will be required unless it is desired to change the quantity to be delivered at the next actuation of the pump. This applies to the graduations of the gallon for which the cam may be set.

As heretofore described, the driving shaft 24 is normally disconnected from the transmission mechanism for imparting movement to the driven shaft 21 for the purpose of causing the pump to deliver liquid, and in order to permit the actuation of the pump, the stem 48 must be depressed. This stem being contained entirely within the casing 23, the actuating mechanism is in reality locked, since the unauthorized setting of the mechanism is thus prevented. While various expedients may be employed to effect the actuation of the stem 48, I have shown and described a check controlled mechanism for this purpose, and I will now describe the operation of this particular mechanism.

A check, which may, if desired bear a special mark identifying the person to whom the liquid is delivered, is inserted through the openings 76—77 into the recess 78 in the carriage 74. When the check has thus been inserted, the plunger 81 is depressed, oscillating the bell crank lever and imparting a forward reciprocatory movement to the carriage 74. The check after passing the slot 76 will engage the bevelled end of the stem 48 and depress said stem by reason of the fact that the top of said check engages the top of the casing 75. When the check has passed the stem 48, the spring 85 will move the check laterally and drop it into the mouth of the runway 83. The check will be intercepted when adjacent the sight opening 86 by the extension 87 upon the stem 48, and be held in this position until the next actuation of the stem under the control of another check. Upon the release of the plunger 81, the spring 82 will restore it, the bell crank lever 79 and the carriage 74 to their former positions with the slot 77 in register with the slot 76. When upon a succeeding actuation of the stem 48, a check exposed through the opening 86 is released, it will descend through the runway 83 and be delivered thereby into the receiver 84. Since a record is made of each transaction for which the machine is used, by comparing the position of any check with the position of the correspondingly positioned entry upon the duplicate paper web, the quantity of liquid which was withdrawn when each check was placed in the machine may be checked; and when identifying marks are used on the check, the identity of the purchaser may also be determined. As heretofore stated, after each actuation of the stem 48, the spring 47ᶜ will restore said stem to its normal position.

When the driven shaft is being actuated to cause the delivery of liquid, the pins 118 will be brought successively into engagement with the swivel 117, the stop 121 holding said swivel against movement so as to cause each pin as it is passing said swivel, to impart oscillatory movement to the lever 115, and reciprocatory movement to the slide 109. As heretofore stated, these pins may be so set as to cause the actuation of the lever 115 to be at a time co-incident with the initial delivery of the liquid or at any time after said initial delivery until a full pint has been actually delivered. As the slide 109 moves in a direction toward the wheels 93—94, the pawls 112—113 will be set in relation to their respective ratchet wheels 100, so that upon the return reciprocation of said slide under the control of the spring 114, they will simultaneously actuate the wheels 93 and the wheels 95 to indicate upon the former, that one pint of liquid has been delivered during that actuation of the pump and to add to the total already appearing upon the wheels 95 and 96, a record of this quantity of liquid. In the form of the invention shown, the actuation of the wheels 93—94 is through the printing wheels 102—103, and the gearing connecting said wheels with the wheels 93—94 respectively. When the quantity of liquid delivered exceeds a gallon, the transfer mechanism upon the pints wheel will actuate the gallon wheel of the lowest denomination through the transfer mechanism herein described, the transfer action as to the registering wheels 93—94, being under the control of the printing wheel 102—103. The transfer upon the total adding wheels is entirely independent of the transfer mechanism upon the wheels 102—103. After the delivery of the maximum volume of liquid for which the measuring wheel 53 is set, the driven shaft 21, as heretofore described, is turned in the reverse direction to restore the pump to normal, the wheel 53 being turned in synchronism with said shaft. Upon the return movement of the wheel 53, the respective pins 118 will engage the swivel 117 toppling it about its pivot 119, and avoiding the actuation of the lever 115. The spring 121 will restore said swivel, after the passage of each of the pins 118, to its normal position in engagement with the stop 121. A more detailed description of the registering and totalizing mechanisms will not be entered into, as the same will be apparent from the detailed description of these mechanisms.

It is apparent that since the wheels 102—103 are geared to the registering wheels 93—94, the said printing wheels will be in the printing position when it is desired to make a record of a transaction indicated upon the said registering wheels, the position of the digit upon the printing wheels corresponding with those digit in the printing position upon the registering wheels exposed through the sight openings, the various wheel being so set as to secure this result.

When it is desired to make a record of the delivery of liquid by the pump, the plunger 134 is forced inwardly oscillating the lever 133 and forcing the friction wheels 131 into the desired engagement with the friction wheels 130. As the shaft 132 is raised, the striker 135 will engage the setting lever 127 and oscillate the hammer 126 about its pivot against the tension of the spring 126ª. Prior to the engagement of the wheels 131 with the wheels 130, the striker 135 will pass the lever 127, thus causing the hammer 126 to deliver the desired printing blow under the control of the said spring 126ª. The two-ply web 123 with the interposed sheet of carbon passes over the platen 124 between the printing wheels and the said hammer.

As the said shaft 132 reaches its high position, the arm 137 moves outwardly under the control of its spring 138 to beneath said shaft so that upon the release of the plunger, the wheels 130—131 will be held in their operative relation with each other.

The shaft 132 is then turned by means of the knob 132ª causing a feeding movement of the web below the openings 136—136ª. Prior to the actuation of the shaft 132 any desired autographic records may be made upon the paper web through the said openings.

As the shaft 131 rises under the control of the plunger 134, the stop bar 142 will be positioned adjacent the periphery of the wheels 93—94. As the shaft 132 is turned it will turn the shaft 91 which through the friction clutches 108ª will impart rotary movement to any of the wheels 93—94 which may have been turned until the pin 143 carried thereby engages the said bar 142, whereupon further movement of said wheels will be arrested, without, however, stopping the shaft 91.

This bar 142 will, through its control of the movement of the wheels 93—94, also control the movement of the printing wheels 102—103 so that as the slip is fed forwardly through the machine both the registering wheels 93—94 and the printing wheels 102—103 will be restored to their zero position, the zeros upon the former being at the sight opening, and upon the latter directly above the hammer 126.

Upon the completion of one rotation of the shaft 132, the pin 141 carried by one of the wheels 131 will engage the riser 140 and impart sufficient movement to the arm 137 to force it from below the shaft 132, whereupon said shaft with the wheels 131 will drop preventing further feeding movement and allowing the bar 142 to fall away from the wheels 93—94 so as to permit a free rotation thereof upon the next actuation of the machine.

The pin 141 will normally be positioned below and adjacent the cam riser 139 so that upon the next actuation of the plunger 134 this cam will rotate the shaft 132 sufficiently to ensure uniformity in the starting point of the feeding movement of the said wheels 131.

From the foregoing description, the actuation of the rewinding mechanism for the duplicate strip and the carbon strip will be sufficiently clear to make a detailed description thereof unnecessary.

The various registering mechanisms are so positioned in the movable top of the casing 23 that as the said top is raised, said mechanisms will be carried with it. Said top as clearly appears in Fig. 1, does not take in the entire depth of the casing, the coin control mechanism being positioned at one side of this cover.

As indicated in Fig. 1 suitable locking means are provided to prevent unauthorized access to the interior of the machine. It is apparent that if desired, the various registering mechanisms may be so enclosed as to prevent access thereto when the cover is raised, thus avoiding possibility of tampering with the automatic records of the machine.

The machine shown in the accompanying drawings, and herein described, possesses many refinements which are non-essential to a machine made in accordance with my invention, considered in its broader aspects. The registering and recording mechanisms need not be used unless it be desired to provide a check upon the actuations of the machine. While this checking of the quantity of liquid delivered is desirable it is not my intention to limit the invention considered in the aspects of the delivery of a predetermined quantity of liquid or of the actuation of the pump in delivering the liquid at a low speed and the restoration of the pump to normal at a high speed, or the setting of the machine for different quantities of liquid. While the various mechanisms described co-ordinate in a way to secure a high development in a machine made in accordance with my invention, a much simplified structure embodying the essential characteristics of the invention may be produced with many of these refinements eliminated.

It is not my intention to limit the invention, therefore, to the details of construction shown in the accompanying drawings, it being apparent that many of the mechanisms may be dispensed with, and that others may be modified without departing from the spirit and scope of the invention.

Having described the invention, what I claim as new and desire to have protected by Letters Patent is:—

1. A liquid measuring apparatus embodying therein a driven shaft operatively connected with a pump, a driving shaft, independently operative connections between said shafts whereby said driven shaft may be turned in one direction, to cause the pump to deliver liquid and in the opposite direction to restore the pump to normal, manually operative means whereby one of said connections may be set to actuate the pump, and automatically acting means whereby said last named connection may be made inoperative to cause the pump to deliver only a predetermined volume of liquid comprising a measuring wheel, operative connections between said wheel and said driven shaft, a movable member through which said connections may be made operative or inoperative, a cam carried by said measuring wheel adapted to operatively engage said movable member, and means whereby said cam may be adjusted circumferentially of said wheel to vary its operative moment.

2. A liquid measuring apparatus embodying therein a driven shaft operatively connected with a pump, a driving shaft, independently operative connections between said shafts whereby said driven shaft may be turned in one direction to cause the pump to deliver liquid and in the opposite direction to restore the pump to normal, means whereby one of said connections may be set to actuate the pump, means whereby said last named connection may be made inoperative to cause the pump to deliver only a predetermined volume of liquid and means whereby said last named means may be adjusted to correct error in the apparatus and conform it to the standard measure.

3. A liquid measuring apparatus embodying therein a driven shaft operatively connected with a pump, a driving shaft, independently operative connections between said shafts whereby said driven shaft may be turned in one direction to cause the pump to deliver liquid and in the opposite direction to restore the pump to normal, means whereby one of said connections may be set to actuate the pump, and means whereby said last named connection may be made inoperative to cause the pump to deliver only a predetermined volume of liquid comprising a measuring wheel, operative connections between said wheel and said driven shaft, a movable member through which said connection may be made operative or inoperative, a block mounted adjacent said wheel and adjustable circumferentially thereof, a cam support mounted concentric with said block, a cam carried by said support adapted to operatively engage said movable member, means whereby said block may be set in any adjusted position, and means whereby said cam support may be adjusted circumferentially of said wheel independently of the adjustment of said block.

4. A liquid measuring apparatus embodying therein a driven shaft operatively connected with a pump, a driving shaft independently operative connections between said shafts whereby said driven shaft may be turned in one direction, to cause the pump to deliver liquid and in the opposite direction to restore the pump to normal, means whereby one of said connections may be set to actuate the pump, and means whereby said last named connection may be made inoperative to cause the pump to deliver only a predetermined volume of liquid comprising a measuring wheel, operative connections between said wheel and said driven shaft, a movable member through which said connection may be made operative or inoperative, a cam support mounted adjacent said wheel and adjustable circumferentially thereof, means whereby said block may be set in any adjusted position, a cam slidably mounted upon said support and projecting across the edge of said wheel in a position to operatively engage said movable member, and a spring acting on said cam whereby the movement of said cam will actuate said movable member and the energy stored in said spring will impart additional movement thereto.

5. A liquid measuring apparatus embodying therein a driven shaft operatively connected with a pump, a driving shaft, independently operative connections between said shafts whereby said driven shaft may be turned in one direction, to cause the pump to deliver liquid and in the opposite direction to restore the pump to normal, means whereby one of said connections may be set to actuate the pump, and means whereby said last named connection may be made inoperative to cause the pump to deliver only a predetermined volume of liquid comprising a measuring wheel, operative connections between said wheel and said driven shaft, a movable member through which said connections may be made operative or inoperative, a cam carried by said measuring wheel adapted to operatively engage said movable member, and a fixed cam carried by said wheel whereby both of said connections will be made inoperative when the pump has been restored to normal.

6. A liquid measuring apparatus embodying therein a driven shaft operatively connected with a pump, a driving shaft, a plurality of gears loosely mounted on said driving shaft, a pawl carried by each of said gears, a sleeve slidably mounted on said driving shaft, ratchet wheels carried by said sleeve adjacent said gears respectively, said sleeve having a bevel thereon adjacent each of said ratchet wheels whereby when one of said pawls is permitted to engage its ratchet wheel, the other will be held out of engagement with its ratchet wheel, setting means whereby said sleeve may be shifted toward the smaller of said gears, a measuring wheel having two parallel peripheral grooves, separated by a partition having a sequence of slots therethrough, a movable member having a pin operative upon said sleeve and a second pin adapted to move in either of said grooves, a cam carried by and projecting across one of the peripheral grooves of said measuring wheel and adapted to operatively engage said second pin on said movable member, and shift it from one of said grooves to the other, means whereby said cam may be adjusted circumferentially of said wheel to vary its operative moment, and a fixed cam carried by said wheel and projecting across the other peripheral groove thereof, whereby when said wheel has been returned to normal said sleeve will be moved to a neutral position where neither of said wheels and ratchets will be operatively engaged.

7. A liquid measuring apparatus embodying therein a casing, a driven shaft operatively connected with a pump, a driving shaft, independently operative connections between said shafts, a setting stem within said casing, means whereby the unauthorized actuation of said stem is prevented, operative connections between said stem and said connections whereby the actuation of said stem will make one of said connections operative to turn the driven shaft in one direction to cause the pump to deliver liquid and means actuated from said driven shaft whereby when a predetermined volume of liquid has been delivered, the other of said connections will be made operative to turn said driven shaft in the other direction to restore the pump to normal.

8. A liquid measuring apparatus embodying therein a casing, a driven shaft operatively connected with a pump, a driving shaft, independently operative connections between said shafts, a setting stem within said casing, means whereby the unauthorized actuation of said stem is prevented, operative connections between said stem and said connections whereby the actuation of said stem will make one of said connections operative to turn the driven shaft in one direction to cause the pump to deliver liquid, and means whereby said last named connection may be made inoperative to cause the pump to deliver only a predetermined volume of liquid comprising a measuring wheel, operative connections between said wheel and said driven shaft, a movable member through which said connection may be made operative or inoperative, a cam carried by said measuring wheel adapted to operatively engage said movable member, and means whereby said cam may be adjusted circumferentially of said wheel to vary its operative moment.

9. A liquid measuring apparatus embodying therein a casing, driven shaft operatively connected with a pump, a driving shaft, a plurality of gears loosely mounted on said driving shaft, a pawl carried by each of said gears, a sleeve slidably mounted on said driving shaft, ratchet wheels carried by said sleeve adjacent said gears respectively, means carried by said sleeve adjacent each of said ratchet wheels whereby one of said pawls will be permitted to engage its ratchet wheel and the other will be held out of engagement with its ratchet wheel, a setting stem within said casing, means whereby the unauthorized actuation of said stem is prevented, means adapted to be actuated by said stem whereby said sleeve may be shifted in one direction to connect one of said gears to said shaft, automatically acting means whereby said sleeve may be shifted in the opposite direction to disconnect said first named gear from said shaft and connect the other gear therewith, and a plurality of gears carried by and rotatable with said driven shaft and entrained with said gears upon said driving shaft respectively whereby when one of said gears is connected with said driving shaft, the pump will be actuated to deliver liquid and when the other of said gears is connected with said driving shaft, the pump will be restored to normal.

10. A liquid measuring apparatus embodying therein a casing, a driven shaft operatively connected with a pump, a driving shaft, a plurality of gears loosely mounted on said driving shaft, a pawl carried by each of said gears, a sleeve slidably mounted on said driving shaft, ratchet wheels carried by said sleeve adjacent said gears respectively, means carried by said sleeve adjacent each of said ratchet wheels whereby one of said pawls will be permitted to engage its ratchet wheel and the other will be held out of engagement with its ratchet wheel, said sleeve having a pinway therein, a measuring wheel having a peripheral groove therein, an oscillatory lever having oppositely projecting pins projecting into the pinway upon said sleeve and the groove of said lever wheel respectively, a reciprocatory setting stem within said casing, means whereby the unauthorized actuation of said stem is prevented, a bell crank lever operatively connected with said stem and adapted to engage and oscillate said sleeve and shift it toward one of said levers and operatively connect it with said driving shaft, and a cam rotatable with said measuring wheel and projecting over the peripheral groove thereof whereby said sleeve will be automatically shifted in the opposite direction to disconnect said gear from said shaft and connect the other gear thereto, and a plurality of gears carried by and rotatable with said driven shaft and entrained with said gears upon said driving shaft respectively whereby when one of said gears is connected with said driving shaft, the pump will be actuated to deliver liquid and when the other of said gears is connected with said driving shaft, the pump will be restored to normal.

In witness whereof, I hereunto affix my signature in the presence of two subscribing witnesses, this 11th day of March, 1916.

JOHN F. MILLIGAN.

Witnesses:
CLARICE FRANCK,
JUDITH PARDEE.